United States Patent [19]

Wysocki

[11] Patent Number: 4,746,002
[45] Date of Patent: May 24, 1988

[54] JAM COMPENSATION IN DELIVERING DISPENSER CAP ASSEMBLIES

[75] Inventor: Peter Wysocki, Haworth, N.J.

[73] Assignee: PMC Industries, Hackensack, N.J.

[21] Appl. No.: 43,768

[22] Filed: Apr. 29, 1987

[51] Int. Cl.⁴ .................................................. B65G 37/00
[52] U.S. Cl. ............................................. 198/367; 198/358
[58] Field of Search ............... 198/391, 392, 367, 719, 198/368, 356, 358

[56] References Cited

U.S. PATENT DOCUMENTS

| | | | |
|---|---|---|---|
| 1,543,307 | 6/1925 | Wilson | 198/367 |
| 3,407,964 | 10/1968 | Wysocki et al. | 221/167 X |
| 3,910,407 | 10/1975 | Sterling | 198/392 X |
| 4,125,184 | 11/1978 | Seragnoli | 198/367 X |
| 4,158,624 | 6/1979 | Ford et al. | 198/367 X |
| 4,479,582 | 10/1984 | Ducloux | 198/367 X |
| 4,610,345 | 9/1986 | Spreen et al. | 198/392 |

Primary Examiner—Robert J. Spar
Assistant Examiner—Cheryl L. Gastineau
Attorney, Agent, or Firm—Samuelson & Jacob

[57] ABSTRACT

An apparatus for orienting and delivering dispenser cap assemblies includes a transfer arrangement for accepting oriented cap assemblies from an orienter and stabilizing the cap assemblies into a stabilized stream of oriented cap assemblies for further operations, the transfer arrangement having a guide track with a gate section at a jam-prone portion of the guide track and a diverter section upstream of the gate section such that upon the occurence of a jam in the jam-prone portion, the gate section is actuated to open the jam-prone portion and clear the jam, and the diverter section is actuated to divert further cap assemblies away from the jam-prone portion until the jam is cleared.

13 Claims, 3 Drawing Sheets

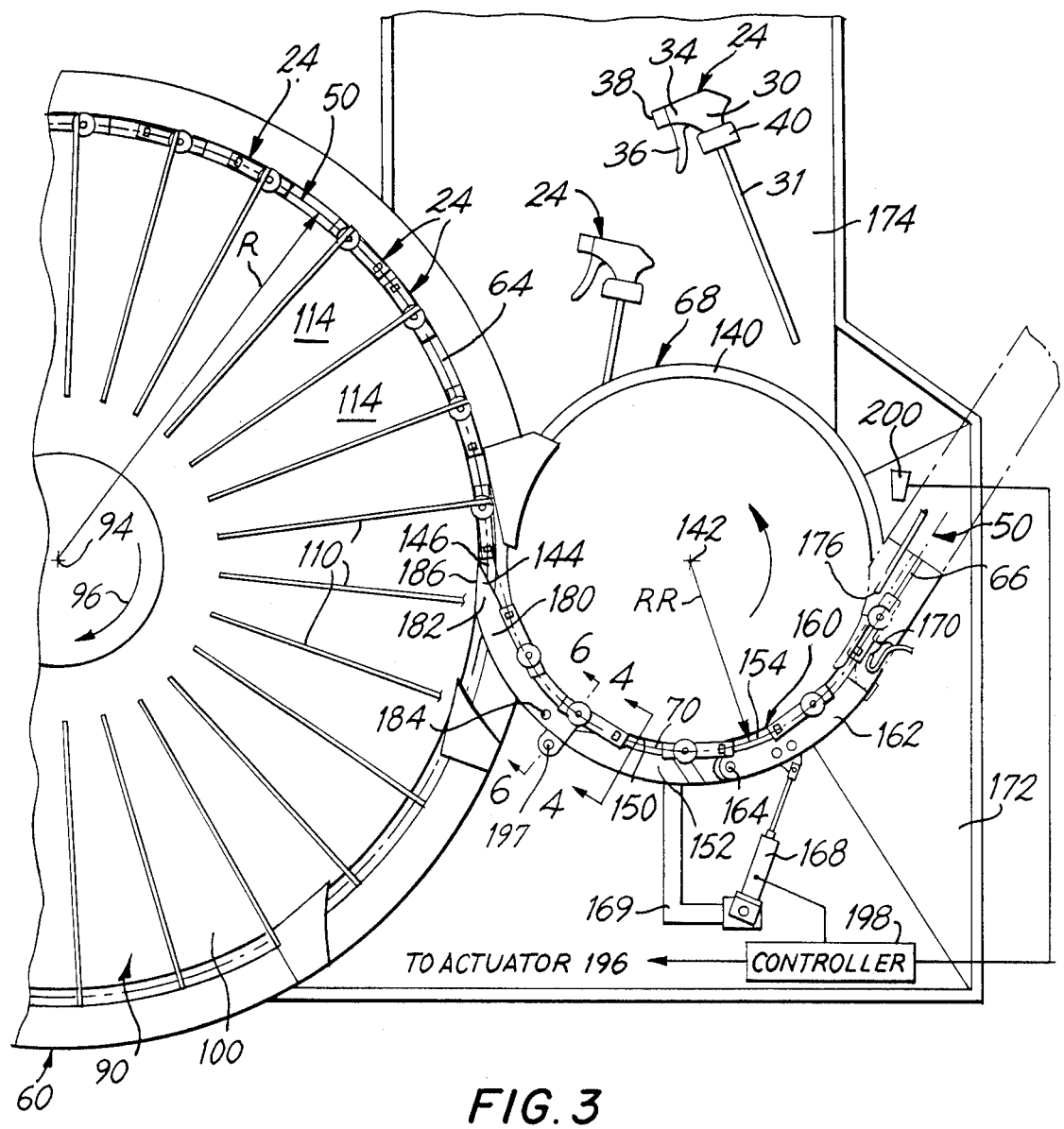
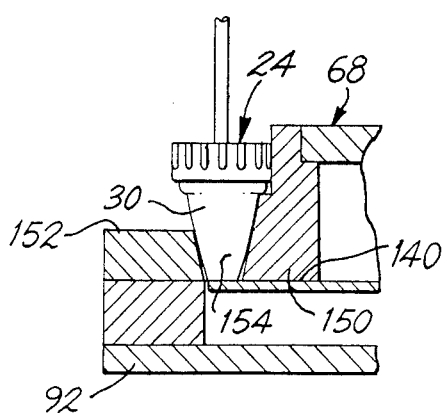
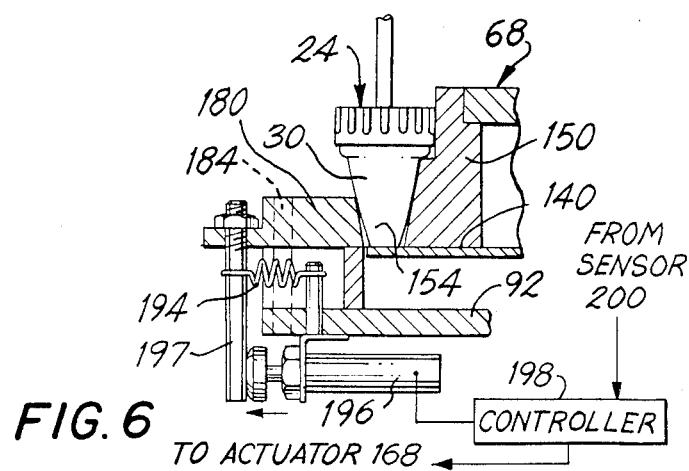
FIG. 3
FIG. 4
FIG. 6

JAM COMPENSATION IN DELIVERING DISPENSER CAP ASSEMBLIES

The present invention relates generally to capping operations in which filled containers are capped with dispenser cap assemblies and pertains, more specifically, to apparatus for orienting and delivering such cap assemblies serially, in rapid succession, appropriately aligned and oriented for the capping operations.

Mechanized filling and capping of containers has reached a highly developed state. The increasing numbers of containers which must be filled and capped each year has led to the requirement for more rapid and efficient procedures and machines in order to keep pace with the demand. In addition to the large number of such operations, the configuration and construction of caps and containers continually are undergoing changes dictated by function and materials, as well as by aesthetic considerations, and such changes have required concomitant developments in the methods and apparatus for handling the caps and containers.

More particularly, the recent increased popularity of manually-operated pump-type dispenser cap assemblies has brought about a need for handling these cap assemblies in greater numbers and with increased efficiency. Many of the pump-type dispenser cap assemblies currently in use are constructed largely of molded synthetic resin components and are designed in a variety of shapes and sizes. These factors raise problems in handling the cap assemblies when it becomes necessary to deliver the cap assemblies serially, in rapid succession, appropriately aligned and oriented for capping operations.

In U.S. Pat. No. 4,610,345, the disclosure of which is incorporated herein by reference thereto, there is described apparatus and method for effectively handling dispenser cap assemblies so as to facilitate the delivery of such cap assemblies serially, in rapid succession, appropriately aligned and oriented for capping operations. The present invention provides an improvement in the apparatus described in the aforesaid patent, by which both speed and effectiveness are increased. In particular, the apparatus of the present invention is able to cope with jamming in a more effective manner so as to reduce interruptions and increase the speed of operation.

The present invention provides several objects and advantages, some of which may be summarized as follows: Effective delivery of dispenser cap assemblies serially, in more rapid succession, appropriately aligned and oriented for capping operations; capable of use with a variety of dispenser cap assembly styles and configurations; efficient handling of jamming to enable increased rapidity of operation and less frequent interruption of operation; more compactness for reduced space requirements at a capping facility; increased simplicity in design and construction for reduced expense; greater flexibility in adapting to a wider variety of dispenser cap assembly styles and designs.

The above objects and advantages, as well as further objects and advantages, are attained by the present invention which may be described briefly as providing an improvement in apparatus for orienting and delivering dispenser cap assemblies advanced along a path of travel and having means rotatable about a generally vertical axis for receiving the randomly oriented cap assemblies, orienting at least some of the cap assemblies and delivering the oriented cap assemblies serially, in prescribed orientation, to a generally horizontal first segment of the path of travel, and transfer means located along a transition segment of the path of travel for transferring the oriented cap assemblies from the first segment downstream to a further segment of the path of travel, the improvement in which the transfer means delivers a stabilized stream of appropriately oriented cap assemblies to the further segment of the path of travel, the improvement comprising: a guide track intercepting the first segment of the path of travel at a transfer point between the first segment and the transition segment, the guide track extending along the transition segment to guide the oriented cap assemblies along the transition segment, through a jam-prone portion of the path of travel, toward the further segment, the guide track including a gate section mounted for swinging movement toward and away from the transition segment, between a first position wherein the gate section is integrated with the guide track to guide the cap assemblies along the transition section, and a second position wherein the gate section is displaced away from the transition segment to establish an opening in the guide track, at the jam-prone portion of the path of travel, through which opening cap assemblies jammed in the jam-prone portion will leave the path of travel; a diverter section extending along the guide track between the transfer point and the gate section and having a diverter tip adjacent the transfer point at the entrance to the transition segment, the diverter section being mounted for swinging movement between a first position wherein the diverter tip intercepts the first segment and directs cap assemblies into the transition segment, and a second position wherein the diverter tip enters the path of travel to close the entrance to the transition segment and divert cap assemblies out of the path of travel so as to preclude travel of the cap assemblies to the jam-prone portion; and actuating means for moving the diverter section to the second position thereof when the gate section is in the second position thereof.

The invention will be understood more fully, while still further objects and advantages will become apparent, in the following detailed description of a preferred embodiment illustrated in the accompanying drawing, in which:

FIG. 3 is an enlarged fragmentary plan view of a portion of the apparatus of FIG. 1;

FIG. 4 is a cross-sectional view taken long line 4—4 of FIG. 3.

FIG. 6 is a cross-sectional view taken along line 6—6 of FIG. 3.

Figure 1:
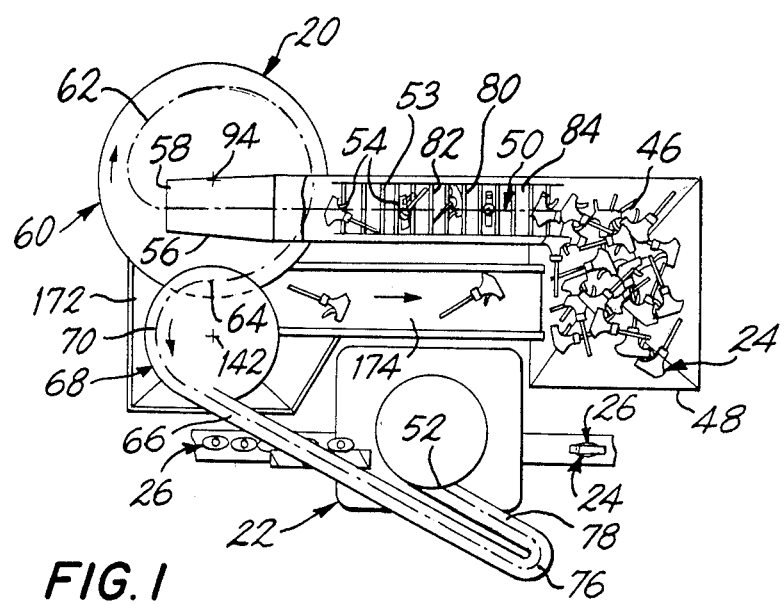
FIG. 1 is a largely diagrammatic plan view illustrating an apparatus constructed in accordance with the present invenion.
Figure 2:
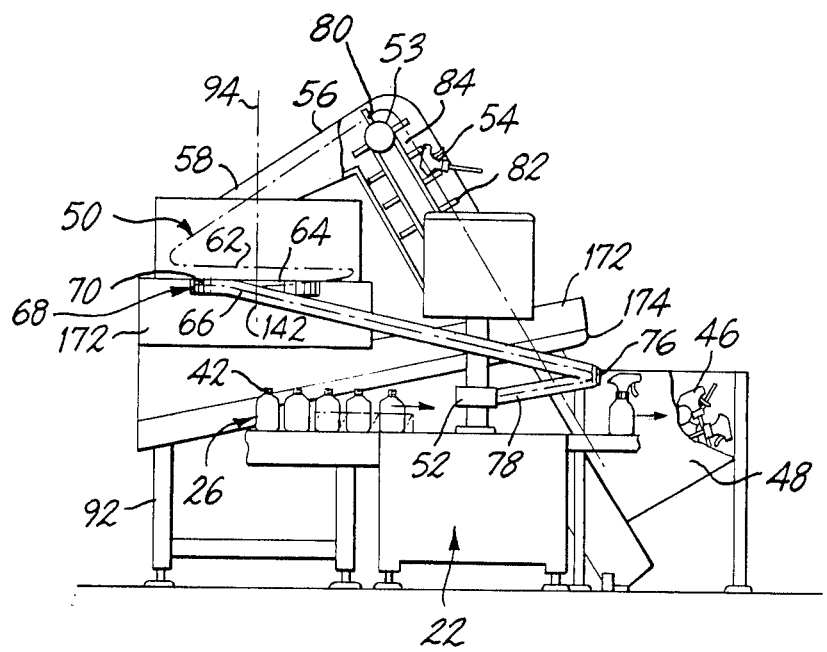
FIG. 2 is an elevational view, largely diagrammatic, of the apparatus of FIG. 1.

Referring now to the drawing, and especially to FIGS. 1 and 2 thereof, apparatus constructed in accordance with the invention is illustrated diagrammatically at 20 and is shown in use in connection with a capping machine 22. Together, apparatus 20 and capping machine 22 accomplish a capping operation in which a pump-type dispenser cap assembly 24 is joined with a container in the form of bottle 26 to close the container.

As best seen in FIG. 3, cap assembly 24 includes a cap 30 and a dip tube 31 integral with the cap 30 and depending from the cap. Cap 30 has a spray pump 34 capable of manual operation by means of a trigger 36 which can be pumped to deliver a spray through a nozzle 38. A threaded collar 40 joins the cap assembly 24 to the bottle 26 which has threads 42 (see FIG. 2) complementary to those of the threaded collar 40. The illustrated component parts of cap assembly 24 all are constructed of synthetic resin materials, as is bottle 26, and the contour configurations of both the cap 30 and the bottle 26 have been designed on the basis of aesthetic considerations, as well as for ergonomic reasons. The materials and configuration of cap assembly 24 place limitations upon any apparatus employed in handling such cap assemblies during the capping operation. Thus, the synthetic resin materials, being inherently non-magnetic, preclude the use of magnetic devices for manipulating the cap assemblies. The aesthetic and ergonomic contours provide a configuration not necessarily designed for ready location and movement by mechanical handling devices; yet, each cap assembly 24 must be delivered to a bottle 26 and joined with the bottle in only one particular relative position, as shown.

Returning now to FIGS. 1 and 2, the apparatus of the present invention orients and delivers cap assemblies 24 from a mass 46 of randomly oriented cap assemblies 24 contained within a bin 48 along a path of travel 50 to a discharge point 52 where the cap assemblies 24 are presented serially in a prescribed orientation to the capping machine 22 for capping. Broadly, cap assemblies 24 are fed from bin 48 by feed means in the form of a feed elevator 53 which lifts batches 54 of cap assemblies 24 from mass 46 to an inlet chute 56 which leads the batches 54 to an inlet location 58 located along path of travel 50 above a first orienting means 60. As described in greater detail in the aforesaid U.S. Pat. No. 4,610,345, first orienting means 60 receives the randomly oriented cap assemblies 24 at the inlet location 58 and imparts to the cap assemblies 24 a generally spiral movement outwardly from the inlet location 58, as indicated at leg 62 of path of travel 50, while allowing the cap assemblies 24 to move axially downwardly. First orienting means 60 takes advantage of the fact that the cap 30 of each cap assembly 24 is heavier than the respective dip tube 32 and is arranged so that the heavier cap 30 will drop downwardly ahead of the lighter dip tube 32 to orient each cap assembly 24 with the cap 30 vertically below the dip tube 32 and to place the so-oriented cap assemblies 24 along a generally horizontal segment 64 of the path of travel 50.

Cap assemblies 24 are transferred from segment 64 of the path of travel 50 to a further segment 66 of the path of travel 50 by a transfer means 68 located along a transition segment 70 of the path of travel 50. Segment 66 follows a re-entrant path at 76 so that cap assemblies 24 are re-oriented along segment 66 to continue travel beyond re-entrant path 76 with the cap 30 of each cap assembly 24 now lying above the corresponding downwardly-depending dip tube 32. The reoriented cap assemblies 24 then are advanced along a further segment 78 of path of travel 50 to the discharge point 52 where the capping machine 22 can join the cap assemblies 24 with bottles 26. It is noted that the details of the capping method and capping machine 22 form no part of the present invention. Suffice it to say that the capping machine 22 relies upon the delivery of cap assemblies 24 serially, in appropriate alignment and orientation, and in sufficient quantity to effect a high-speed mechanized operation. Thus, the speed at which the cap assemblies 24 are to be delivered to delivery point 52 must be high enough to deliver about 120 to 300 cap assemblies per minute in proper alignment and orientation.

Turning now to FIGS. 3 and 4, as well as to FIGS. 1 and 2, feed elevator 53 has a cleated conveyor 80 carrying cleats 82 which establish pockets 84 within which batches 54 of cap assemblies 24 are carried to inlet chute 56. The cap assemblies 24 descend along inlet chute 56 to inlet location 58 where the cap assemblies 24 are dropped onto a drum 90 which forms a part of the first orienting means 60. Drum 90 is mounted upon frame 92 of apparatus 20 for rotation relative to the frame 92 about a vertical axis 94 in a clockwise direction as indicated by arrow 96, and includes a generally frusto-conical surface 100 and a plurality of vertical partitions 110 carried by the frusto-conical surface 100 of drum 90. Partitions 110 establish compartments 114 which rotate as the drum 90 rotates.

As the cap assemblies 24 are received upon surface 100 of the rotating drum 90, one or more cap assemblies will fall into each compartment 114 and cap assemblies 24 will be delivered serially, oriented with caps 30 below dip tubes 32, to segment 64 of path of travel 50, as described in the aforesaid U.S. Pat. No. 4,610,345.

The oriented cap assemblies 24 then are transferred from the orienting means 60 by transfer means 68 which includes a transfer disc 140, mounted on frame 92 for rotation about a vertical axis 142 spaced laterally from the axis of rotation 94 of drum 90 of orienting means 60. Transfer disc 140 is rotated in a counterclockwise direction, as viewed in FIG. 3. Transfer of the oriented cap assemblies 24 to the transfer disc 140 is accomplished by a transfer guide finger 144 located at a transfer point 146 shown as the point of tangency between the rotating drum 90 and the rotating transfer disc 140, and which projects toward the rotating drum 90 at the level of the caps 30 of the oriented cap assemblies 24. Thus, the caps 30 of the oriented cap assemblies 24 are intercepted by guide finger 144 to change the direction of travel of the cap assemblies 24 to follow the periphery of the transfer disc 140.

In order to prevent overlapping of adjacent caps 30 in the stream of advancing cap assemblies 24 during transfer from drum 90 to transfer disc 140, transfer disc 140 is rotated at a rate which provides a surface speed at the outer periphery thereof greater than the surface speed of the drum 90. In this manner the cap assemblies 24 are accelerated as they pass from the drum 90 to the transfer disc 140 and the spacing between adjacent cap assemblies is increased to assure that the cap assemblies do not overlap. Such overlapping could disturb the smooth flow of properly oriented cap assemblies and is to be avoided. Thus, the rate of speed of the transfer disc 140 is about fifty percent greater than the rate of speed of the drum 90.

It is noted that the segment 70 of path of travel 50 followed by the oriented cap assemblies 24 is made long enough so that the oriented cap assemblies 24 will have sufficient time to settle down and become stabilized in the desired orientation while moving along the path of travel 50. That is, any tendency for the cap assemblies 24 to rock forward and backward, or side-to-side, as the cap assemblies become seated within the contoured surfaces which guide the cap assemblies along the prescribed path of travel, while the cap assemblies are maintained in proper orientation, eventually is overcome by means of the lineal extent of the segment 70 which provides time for the stabilization of the cap assemblies within the stream of advancing cap assemblies. Thus, the transfer means 68, and especially transfer disc 140, serves to effect an orderly transfer of the stream of cap assemblies 24 and provides means by which the cap assemblies 24 are stabilized for effective transfer to the further segment 66 of the path of travel 50.

For speed of operation and for compactness in apparatus 20, it is advantageous to maintain the length of segment 70 at a minimum compatible with the attainment of a stabilized stream of oriented cap assemblies 24. In the illustrated arrangement, the oriented cap assemblies 24 travel along first segment 64 extending along a first arcuate path having a curvature defined by the radius R extending from axis of rotation 94, while the transition segment 70 follows a second arcuate path having a curvature reversed relative to that of segment 64 and defined by radius RR extending from axis 142. The length of transition segment 70 is reduced to fall within the range of about 150° to 160° along the periphery of transfer disc 140.

As best seen in FIGS. 3 and 4, the transfer disc 140 is provided with a contoured inner ring 150 complementary to the configuration of the corresponding portions of caps 30. An outside rail 152, which continues from transfer guide finger 144, also has a complementary contour and, together with inner ring 150, establishes a guide track 154 which serves to retain the cap assemblies 24 within the path of travel 50 and against the transfer disc 140 for movement of the cap assemblies 24 by the transfer disc 140.

In order to enable higher speed operation, that is, the delivery of about 120 to 300 cap assemblies per minute at delivery point 52, it becomes necessary to cope effectively with increased incidents of jamming which can take place as the cap assemblies 24 are being stabilized along transition segment 70 of path of travel 50. The jam-prone portion of path of travel 50 lies along guide track 154 at 160 adjacent the transition from transition segment 70 to further segment 66 of path of travel 50. Thus, as the speed of delivery of cap assemblies 24 is increased, the tendency for cap assemblies 24 to become jammed at jam-prone portion 160 is increased.

Figure 5:
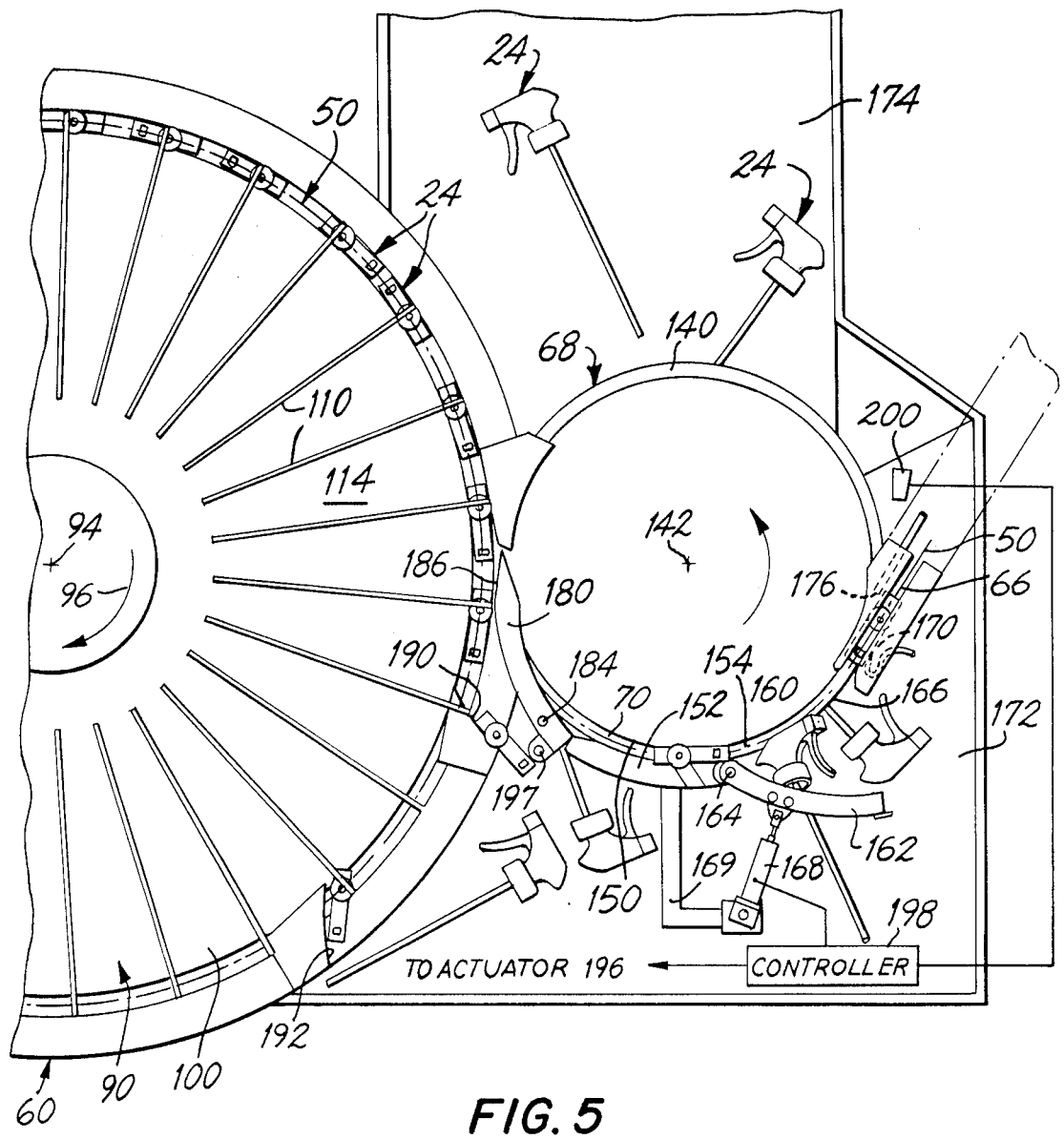
FIG. 5 is an enlarged fragmentary view similar to FIG. 3, but with component parts in another operating position.

Apparatus 20 compensates for jams by placing a gate section 162 in rail 152 at the jam-prone portion 160 of the path of travel 50. Gate section 162 is mounted for swinging movement about a pin 164 between a first position, illustrated in FIG. 3, wherein the gate section 162 is integrated with the guide track 154 to guide the cap assemblies 24 along the transition segment 66 of path of travel 50, and a second position, illustrated in FIG. 5, wherein the gate section 162 is displaced away from the transition segment 70 to establish an opening 166 in the guide track 154, at the jam-prone portion 160 of the path of travel 50. An actuator in the form of an air cylinder 168 extends between an extension 169 of frame 92 and gate section 162 and moves the gate section 162 between the two positions thereof. When no jam is present, gate section 162 is in the first position and cap assemblies 24 travel along segment 70 to further segment 66 in an orderly fashion, as illustrated in FIG. 3. An air jet 170 assists in moving the cap assemblies 24 from transition segment 70 to the further segment 66 of the path of travel 50. However, should a jam occur at the jam-prone portion 160, air cylinder 168 is actuated to swing gate section 162 to the second position, as seen in FIG. 5, and the cap assemblies 24 in the jam will fall from path of travel 50, through opening 166, to clear the jam. Those cap assemblies 24 which fall through opening 166 will be collected in a chute 172 placed beneath the transfer means 68 and returned to bin 48 by a return conveyor 174. An air jet 176 assists in clearing any such jam.

Effective clearance of a jam at jam-prone portion 160 is facilitated by diverting the stream of cap assemblies 24 away from the jam. Thus, a diverter section 180 is provided in rail 152 between the gate section 162 and transfer point 146. Diverter section 180 includes a diverter tip 182 at the entrance to the transition segment 70, diverter tip 182 carrying the transfer guide finger 144. Diverter section 180 is mounted for swinging movement about a pin 184 between a first position, wherein the transfer guide finger 144 intercepts the first segment 64 of the path of travel 50 and the cap assemblies 24 traveling along the first segment 64 to change the direction of travel of cap assemblies 24 and guide the cap assemblies into the transition segment 70, as illustrated in FIG. 3, and a second position, wherein the diverter tip 182 enters the path of travel 50 to close the entrance to transition segment 70 and place a diverter ramp 186 in the path of travel of the cap assemblies 24, as shown in FIG. 5. The diverter ramp 186 diverts the cap assemblies 24 out of transition segment 70 so that the cap assemblies 24 continue to move with the compartments 114 of drum 90 of orienting means 60. A deflector 190 then deflects the cap assemblies 24 from the compartments 114 and the deflected cap assemblies drop into chute 172 for return to bin 48 by return conveyor 174. Should any cap assemblies 24 fail to be deflected by deflector 190, a second deflector 192 will assure that all the diverted cap assemblies 24 will be recirculated.

As seen in FIG. 6, diverter section 180 is biased into the first position by a helical spring 194 and an actuator in the form of air cylinder 196 is actuated to push against post 197 and swing the diverter section 180 to the second position. A controller 198 controls the actuation of the air cylinders 168 and 196 so that upon movement of the gate section 162 to the second position, the diverter section 180 will be moved to the second position thereof. Such simultaneous movement of the gate section 162 and the diverter section 180 assures that a jam will be cleared effectively. A photoelectric sensor 200 senses the presence of a jam at jam-prone portion 160 and operates the controller 198. Upon clearing of the jam, the gate section 162 and the diverter section 180 both will be moved to the respective first positions, enabling resumption of the advancement of cap assemblies 24 along transition segment 70 to further segment 66 of path of travel 50. Thus, rapid and accurate advancement of a stream of properly oriented cap assemblies is attained.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. In apparatus for orienting and delivering dispenser cap assemblies advanced along a path of travel extending downstream from a supply of randomly oriented cap assemblies, the apparatus including orienting means located along the path of travel and having means rotatable about a generally vertical axis for receiving the randomly oriented cap assemblies, orienting at least some of the cap assemblies and delivering the oriented cap assemblies serially, in prescribed orientation, to a generally horizontal first segment of the path of travel, and transfer means located along a transition segment of the path of travel for transferring the oriented cap assemblies from the first segment downstream to a further segment of the path of travel, the improvement in which the transfer means delivers a stabilized stream of appropriately oriented cap assemblies to the further segment of the path of travel, the improvement comprising:

- a guide track intercepting the first segment of the path of travel at a transfer point between the first segment and the transition segment, the guide track extending along the transition segment to guide the oriented cap assemblies along the transition segment, through a jam-prone portion of the path of travel, toward the further segment, the guide track including
- a gate section mounted for swinging movement toward and away from the transition segment, between a first position wherein the gate section is integrated with the guide track to guide the cap assemblies along the transition section, and a second position wherein the gate section is displaced away from the transition segment to establish an opening in the guide track, at the jam-prone portion of the path of travel, through which the opening cap assemblies jammed in the jam-prone portion will leave the path of travel;
- a diverter section extending along the guide track between the transfer point and the gate section and having a diverter tip adjacent the transfer point at the entrance to the transition segment, the diverter section being mounted for swinging movement between a first position wherein the diverter tip intercepts the first segment and directs cap assemblies into the transition segment, and a second position wherein the diverter tip enters the path of travel to close the entrance to the transition segment and divert cap assemblies out of the path of travel so as to preclude travel of the cap assemblies to the jam-prone portion; and
- actuating means for moving the diverter section to the second position thereof when the gate section is in the second position thereof.

2. The invention of claim 1 wherein the actuator means include means for moving the gate section to the second position thereof, and means for simultaneously moving the diverter section to the second position thereof.

3. The invention of claim 1 wherein the transition segment is essentially tangent to the first segment of the path of travel at the transition point.

4. The invention of claim 1 wherein the rotation of the rotatable means of the orienting means advances the oriented cap assemblies along the first segment at a first rate of travel and the transfer means includes drive means for accelerating the oriented cap assemblies from the first rate of travel to a second rate of travel along the transition segment, the second rate of travel being approximately fifty percent greater than the first rate of travel.

5. The invention of claim 1 wherein the first segment extends along a first arcuate path and the transition segment extends along a second arcuate path.

6. The invention of claim 5 wherein the second arcuate path has a curvature reversed relative to the first arcuate path.

7. The invention of claim 6 wherein the transition segment is essentially tangent to the first segment of the path of travel at the transition point.

8. The invention of claim 6 wherein the transition segment extends along a segment of a circle, the segment extending within the range of about 150° to 160°.

9. The invention of claim 8 wherein the transition segment is essentially tangent to the first segment of the path of travel at the transition point.

10. The invention of claim 6 wherein the actuator means include means for moving the gate section to the second position thereof, and means for simultaneously moving the diverter section to the second position thereof.

11. The invention of claim 10 wherein the transition segment is essentially tangent to the first segment of the path of travel at the transition point.

12. The invention of claim 11 wherein the transition segment extends along a segment of a circle, the segment extending within the range of about 150° to 160°.

13. The invention of claim 12 wherein the rotation of the rotatable means of the orienting means advances the oriented cap assemblies along the first segment at a first rate of travel and the transfer means includes drive means for accelerating the oriented cap assemblies from the first rate of travel to a second rate of travel along the transition segment, the second rate of travel being approximately fifty percent greater than the first rate of travel.

* * * * *